(12) United States Patent
Kim

(10) Patent No.: US 6,739,469 B1
(45) Date of Patent: May 25, 2004

(54) WATER TANK

(76) Inventor: Dong Gyun Kim, Hyochang Villa 103, 245 Yangjae 2-dong, Seocho-ku (KR), 137-132

( * ) Notice: Subject to any disclaimer, the term of this patent is extended or adjusted under 35 U.S.C. 154(b) by 0 days.

(21) Appl. No.: 10/130,619

(22) PCT Filed: Nov. 17, 2000

(86) PCT No.: PCT/KR00/01321

§ 371 (c)(1),
(2), (4) Date: May 17, 2002

(87) PCT Pub. No.: WO01/36314

PCT Pub. Date: May 25, 2001

(30) Foreign Application Priority Data

Nov. 18, 1999 (KR) .................................. 1999/25308 U
Apr. 6, 2000 (KR) .................................. 2000/17915 U

(51) Int. Cl.[7] .................................. B65D 6/00
(52) U.S. Cl. .................... 220/4.12; 220/4.17; 220/565
(58) Field of Search .................. 220/4.12, 681, 220/565, 4.17, 4.16; 277/651; 217/4

(56) References Cited

U.S. PATENT DOCUMENTS

| | | | | | |
|---|---|---|---|---|---|
| 154,505 | A | * | 8/1874 | McHenry | ..................... 48/176 |
| 1,073,871 | A | * | 9/1913 | Sillman | ..................... 220/4.17 |
| 1,089,134 | A | * | 3/1914 | Hettinger | ..................... 277/633 |
| 1,289,469 | A | * | 12/1918 | Ickes | ..................... 220/4.17 |
| 2,333,792 | A | * | 11/1943 | Jackson | ..................... 220/565 |
| 2,357,257 | A | * | 8/1944 | Goetze | ..................... 277/610 |
| 3,355,052 | A | * | 11/1967 | Kaups | ..................... 220/653 |
| 3,814,003 | A | * | 6/1974 | Vacano | ..................... 99/276 |
| 4,331,252 | A | * | 5/1982 | Carren et al. | ..................... 220/4.17 |

* cited by examiner

Primary Examiner—Joseph C. Merek
(74) Attorney, Agent, or Firm—Anderson Kill & Olick, PC

(57) ABSTRACT

A water tank made of stainless steel and having a substantially cylindrical shape is provided. The water tank comprises curved stainless steel panels forming a cylindrical body of the water tank, fan-shaped stainless steel panels forming a cone-shaped top part and a cone-shaped bottom part of the water tank, packing members being inserted between connecting portions of the stainless steel panels, reinforcing members, each having an L-shaped cross-section, which are arranged on both side of the connecting portions, bolts and nuts for coupling the stainless steel panels and the reinforcing members together by being inserted into holes formed thereon, reinforcing bars, an air vent disposed on the center portion of the top part, and a drain pipe disposed on the center portion of the bottom part.

4 Claims, 6 Drawing Sheets

WATER TANK

This is the U.S. national stage of PCT International application No. PCT/KR00/01321, filed on Nov. 17, 2000, designating the United States of America, the contents of which are incorporated by reference into the present application.

FIELD OF THE INVENTION

The present invention relates to a water tank for mass storage; and, more particularly, to a stainless water tank manufactured by assembling without welding.

DESCRIPTION OF THE PRIOR ART

Conventionally, a water tank storing more than 10 tons of water has been made of thick steel plates or plastic materials such as fiber reinforced plastic (FRP). However, the water tank made of steel plates has a demerit that the water stored therein is contaminated by rust and the water tank made of FRP has a demerit that it is weak against external shock. Therefore, water tanks for mass storage are recently made of stainless steel that has anti-rust characteristics.

FIG. 1 shows a conventional stainless water tank 1 that is of a rectangular parallelopiped shape and is made of stainless steel panels 2. The water tank comprises wall portions formed by welding a number of stainless steel panels 2 and a plurality of reinforcing members 3 which are welded in the water tank transversally and longitudinally in order to increase the structural strength of the stainless steel panel 2. The water tank has a manhole 4 on the upper side thereof and a drain hole 5 on the lower side thereof as shown in FIG. 2.

As shown in FIG. 2, each of the stainless steel panel 2 has folded portions 2a which protrude to an inside of the water tank and the folded portions 2a of adjacent stainless panels 2 are welded together, thereby forming the water tank.

However, since a number of stainless steel panels 2 are welded from the inside of the water tank 1 and a plurality of the reinforcing members 3 are welded in the water tank transversally and longitudinally for manufacturing such conventional water tank, lots of time is required and high-priced welding equipments and skilled persons are needed, thereby increasing manufacturing cost.

Further, although stainless steel has anti-rust characteristics, the mechanical properties thereof sharply deteriorate when it is welded and the brittleness of the welded portions increases. Therefore, cracks may develop at the welded portions of the water tank or rust can be formed at the welded portions, thereby contaminating water stored in the water tank.

As shown in FIG. 2, since a bottom surface of the water tank 1 is flat and the folded portions of the stainless steel panels 2a protrude therefrom, the water stored in the water tank is not completely drained and a small amount of water remains with sediments on the bottom surface of the water tank. Thus, the remaining water and sediments are removed by using a suction pipe connected to a suction pump. However, the reinforcing members 3 limit space available for working in the water tank, thereby making the removing operation cumbersome and increasing the occurrences of accidents.

Further, since the water tank has a flat top surface, chroline gas included in the tap water cannot be exhausted from the water tank and remains in an upper portion of the inside of the water tank, thereby corroding the upper surface of the water tank.

Furthermore, since the water tank is of a rectangular parellelopiped shape, the water tank can be broken by a localized pressure increase generated by uneven installation thereof.

THE SUMMARY OF THE INVENTION

It is, therefore, an object of the present invention to provide a stainless water tank of a cylindrical shape which can be manufactured without welding and easily installed, thereby preventing rust development and facilitating draining and cleaning.

In accordance with a preferred embodiment of the present invention, there is provided a water tank comprising a body, a top part and a bottom part, wherein each of the body, the top part and the bottom part includes a plurality of stainless steel panels having connecting portions with a number of holes and extruding to an outside of the water tank;

a plurality of packing members disposed between folded portions of the stainless steel panels; and coupling members inserted into the holes formed on the folded portions and coupling the stainless steel panels.

In accordance with another preferred embodiment of the present invention, there is provided a water tank made of stainless steel that is of a substantially cylindrical shape, comprising:

a plurality of curved stainless steel panels, the curved stainless steel panels being coupled together to form a substantially cylindrical body of the water tank, each of the curved stainless steel panels including a number of holes and a first connecting portion extruded to an outside of the water tank;

a plurality of fan-shaped stainless steel panels being disposed at an upper portion and a lower portion to form a cone-shaped top part and a cone-shaped bottom part of the water tank, respectively, each of the fan-shaped stainless steel panels including a number of holes and a first connecting portion extruding to the outside of the water tank;

a plurality of packing members being inserted between the first and the second connecting portions;

a plurality of reinforcing members, each having an L-shaped cross-section and a number of holes on one side portion and being arranged on both side of the first and the second connecting portion;

a number of bolts and nuts for coupling the curved stainless steel panels, fan-shaped stainless steel panels and the reinforcing members together by being inserted into the holes formed on the first connecting portions, the second connecting portions and the reinforcing members;

a plurality of reinforcing bars, both end portions of each of the reinforcing bars being fixed to the fan-shaped stainless steel panel forming the top part and the fan-shaped stainless steel panel forming the bottom part, respectively;

an air vent disposed on a center portion of the top part which is of a cone-shape and includes the fan-shaped stainless steel panels; and a drain pipe disposed on the center portion of the bottom part which is of a cone-shape and includes the fan-shaped stainless steel panels.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

The preferred embodiments of the present invention will now be described in detail with reference to the accompanying drawings.

Figure 1:
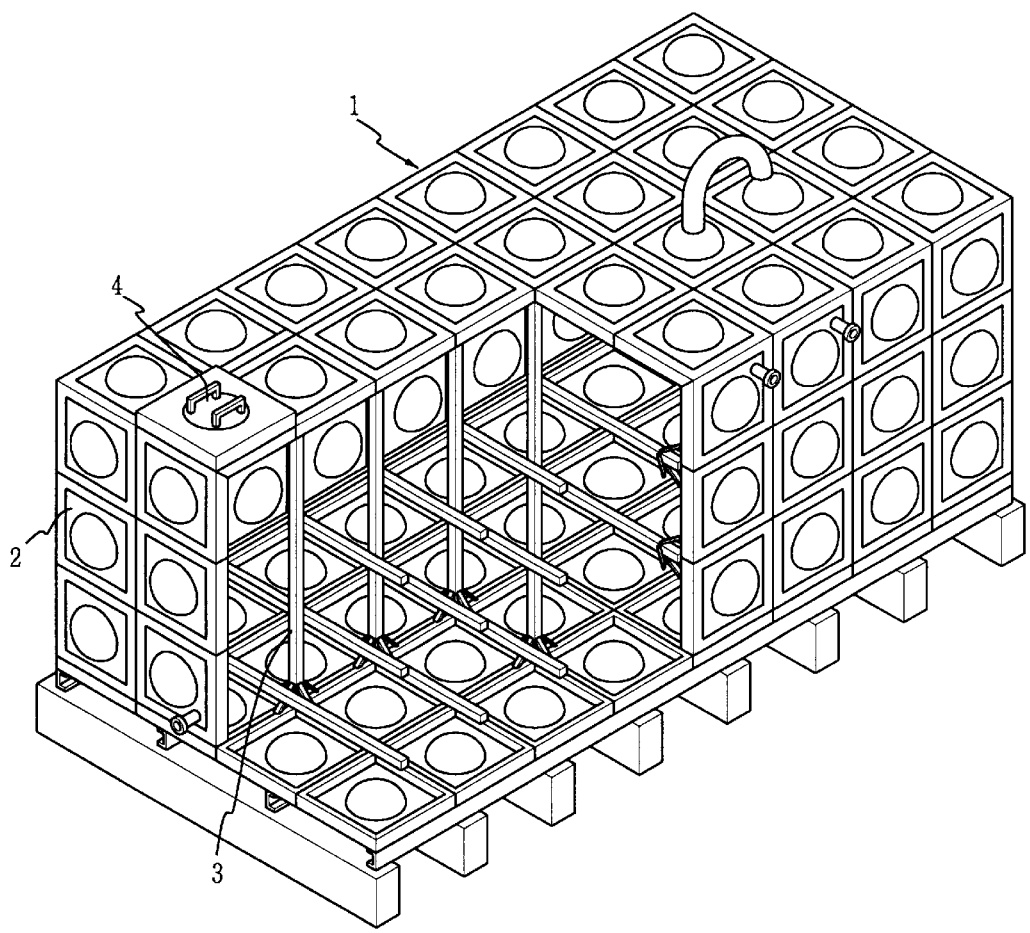
FIG. 1 shows a conventional stainless water tank having a rectangular parallelopiped shape.
Figure 2:
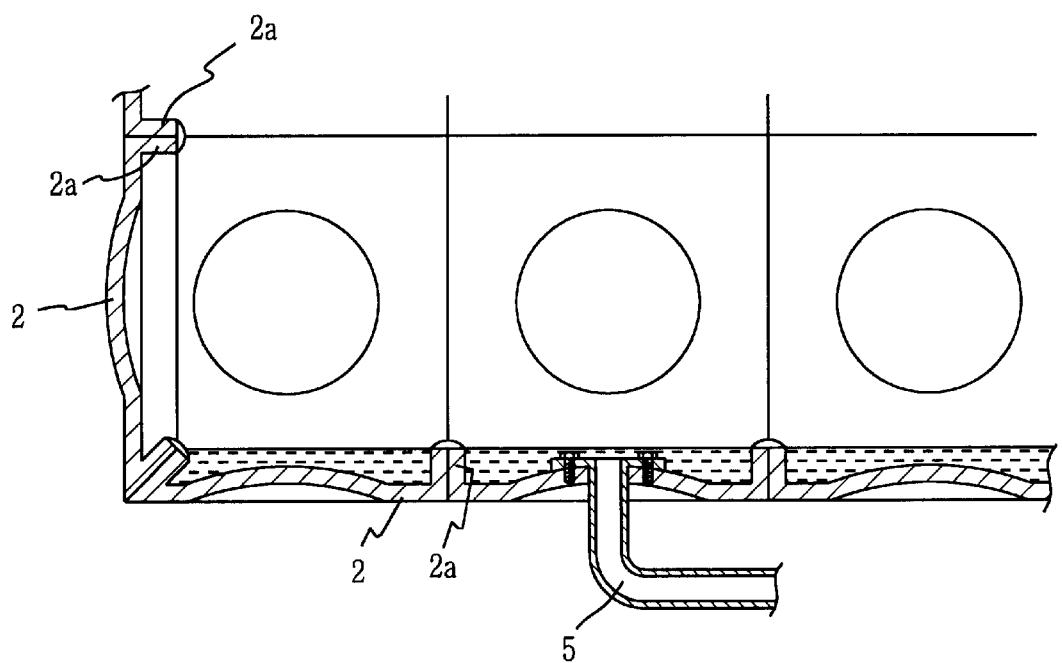
FIG. 2 illustrates a side view of the water tank shown in FIG. 1.
Figure 3:
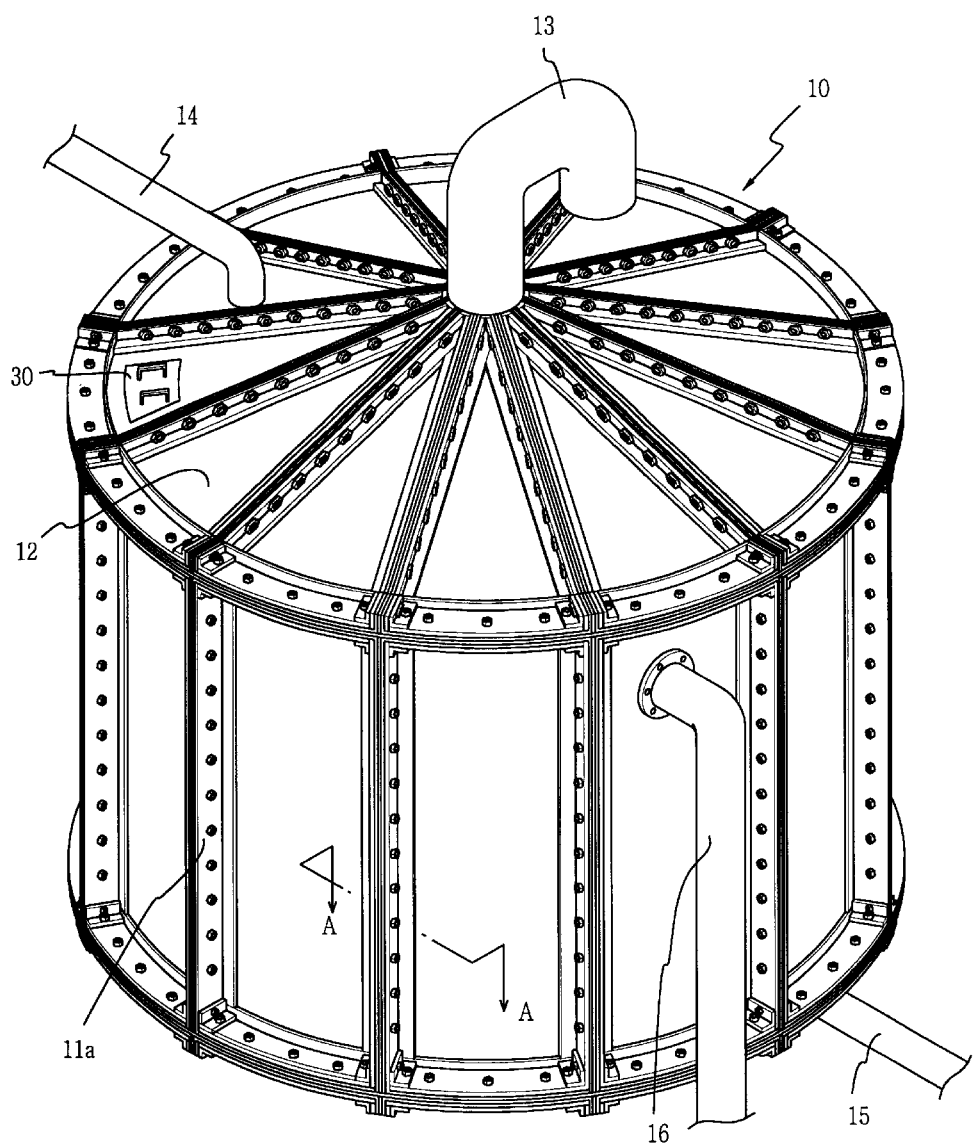
FIG. 3 describes a perspective view of a water tank in accordance with a preferred embodiment of the present invention.
Figure 4:
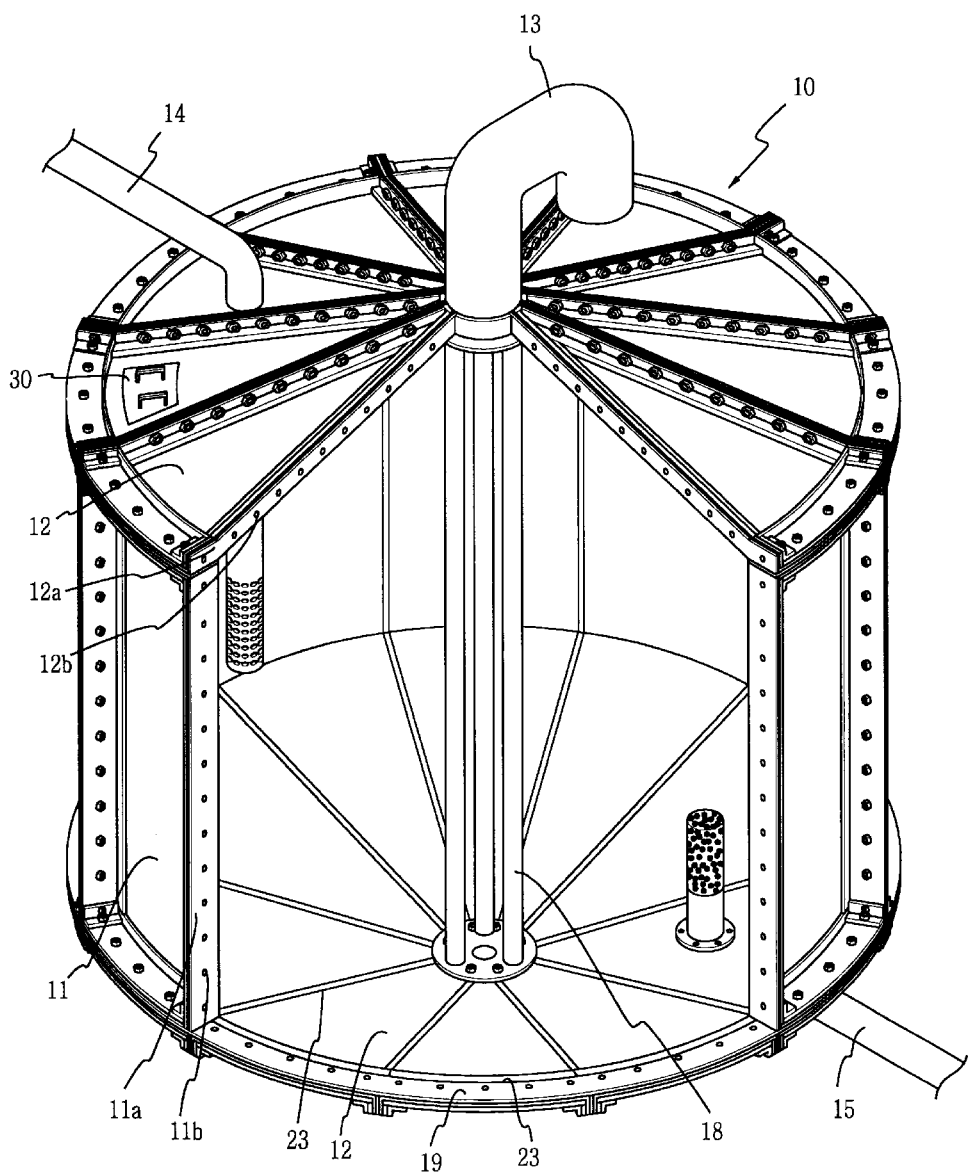
FIG. 4 represents a partially sectional perspective view of the water tank in accordance with the preferred embodiment of the present invention, showing inner portion thereof.
Figure 5:
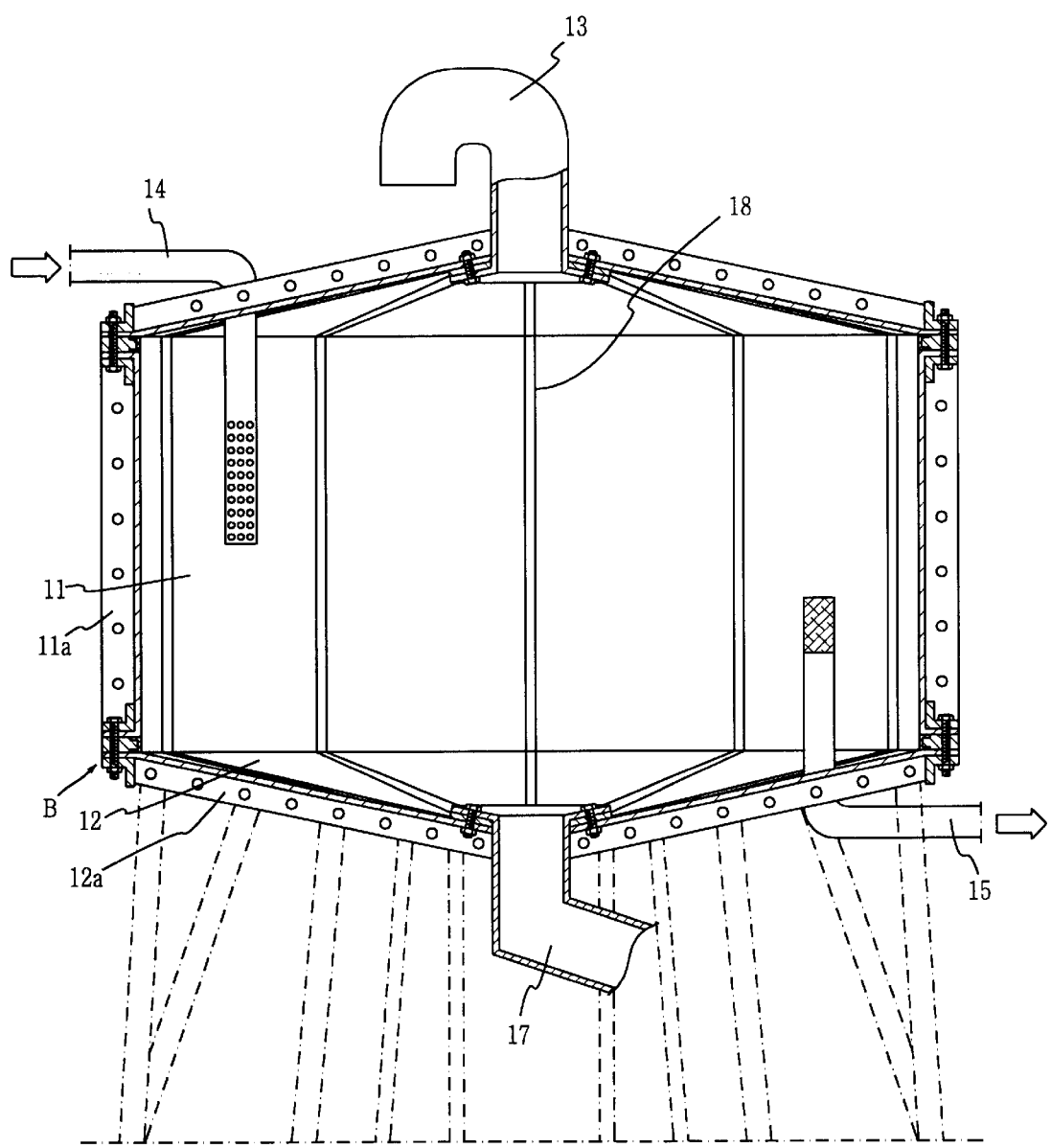
FIG. 5 is a cross sectional view of the water tank in accordance with the preferred embodiment of the present invention.

FIG. 3 describes a perspective view of a water tank in accordance with a preferred embodiment of the present invention and FIG. 4 represents a partially sectional perspective view of the water tank in accordance with the preferred embodiment of the present invention, showing inner portion thereof while FIG. 5 is a cross sectional view of the water tank in accordance with the preferred embodiment of the present invention.

As shown in FIGS. 3 to 5, the water tank. 10 in accordance with the present invention has a cylindrical body formed by coupling a number of curved stainless steel panels 11 having an arc-shaped cross-section. An upper and lower surface of the cylindrical body are covered by fan-shaped stainless panels 12 which are coupled to the cylindrical body and constitute cone-shaped top and bottom part of the water tank.

The cone-shaped top part has an air vent 13 at a center portion thereof and the cone-shaped bottom part has a drain pipe 17 at a center portion thereof. Further, a supplying pipe 14 and a discharging pipe 15 are provided at the cone-shaped top part and the cone-shaped bottom part, respectively. The cylindrical body has a venting pipe 16 at an upper portion thereof.

Between the air vent 13 at the center of the cone-shaped top part and the drain pipe 17 at the center portion of the cone-shaped bottom part, three vertical reinforcing bars 18 are provided as shown in FIG. 4.

Edges of the curved stainless panel 11 and the fan-shaped stainless panel 12 are folded to an outside of the water tank, thereby forming connecting portions 11a and 12a. The connecting portions 11a and 12a have a number of holes 11b and 12b.

Figure 6:
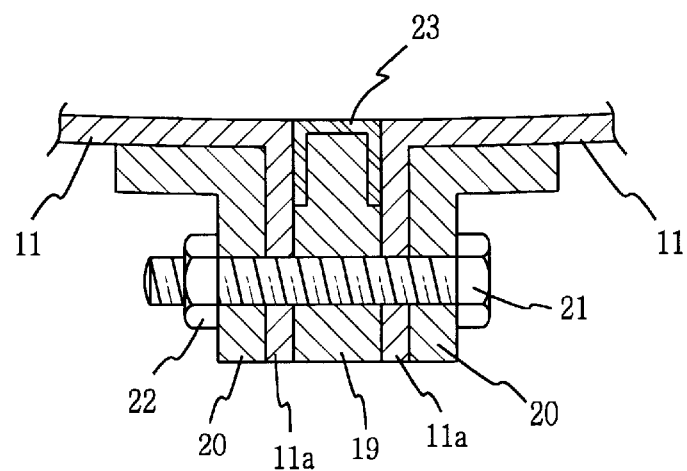
FIG. 6 offers an enlarged cross sectional view taken along the line A—A of FIG. 3.

As shown in FIG. 6, the cylindrical body is constructed as follows: inserting packing members 19 between the connecting portions 11a of the curved stainless steel panels 11, arranging reinforcing members 20, each having an L-shaped cross-section, on the surfaces of the connecting portions 11a and coupling the stainless steel panels 11 with bolts 21 and nuts 22.

Preferably, in order to prevent the packing members 19 from being in contact with water, protecting members 23 made of stainless steel plate are provided to surround the surfaces of the packing members 19 facing to an inside of the water tank. Both edges of the protecting members are inserted between the connection portions 11a of the curved stainless steel panels 11.

A lower portion of the curved stainless steel panels 11 and the fan-shaped stainless steel panels 12 are coupled as follows.

Figure 7:
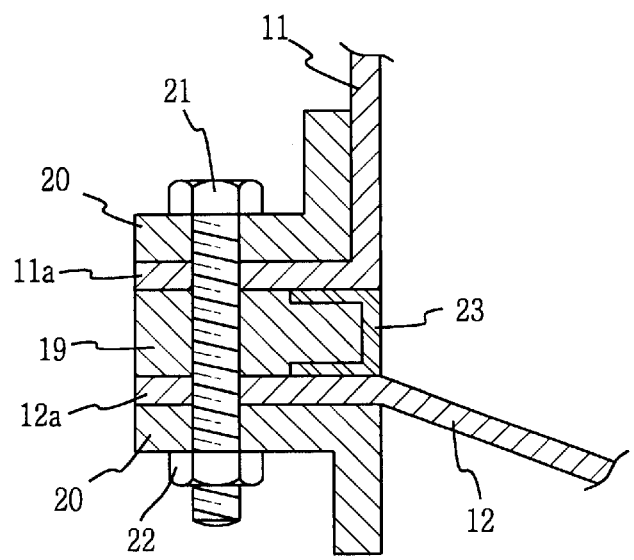
FIG. 7 provides an enlarged view of the part B in FIG. 5.

First, as shown in FIG. 7, packing members 19 are inserted between the connecting portions 11a at the lower portions of the curved stainless panels 11 and the (arc-shaped) connecting portions 12a at upper portions of the fan-shaped stainless steel panels 12. Next, on the (upper) surfaces of the connecting portions 11a of the curved stainless steel panels 11 and on the (lower) surfaces of the connecting portions 12a of the fan-shaped stainless steel panels 12, reinforcing members 20, each having an L-shaped cross-section, are disposed. Then, the stainless steel panels 11 and 12 are coupled by the bolts 21 and nuts 22. Preferably, the protecting members 23 made of stainless steel plate may be arranged in order to surround the surfaces of the packing members 19 facing to the inside of the water tank.

The cone-shaped top part can be formed in a similar way as described above in relation to the cone-shaped bottom part. An entrance (manhole) 30 is provided at the upper surface of the cone-shaped top part.

Preferably, the bolts 21, nuts 22, the reinforcing members 20, each having L-shaped cross-section, and the vertical reinforcing bars 28 are made of stainless steel. The reinforcing members 20 may be made of steel and the inner surfaces contacted with the stainless steel panels 11 and 12 may be coated with anti-corrosive paint. By such configuration, the cost of materials can be reduced.

In manufacturing the water tank in accordance with the present invention, the stainless panels 11 and 12 are not welded but coupled by using the bolts 21 and nuts 22. Therefore, crack and rust development in the welded portion is prevented and contamination of water can also be prevented.

Further, since the water tank in accordance with the present invention comprises a cone-shaped bottom part having the drain pipe 17 at the center portion thereof, water and the sediments in the water tank can be completely drained. Therefore, there is no need for a worker to enter into the water tank for removing the remaining water and sediments and thereby the maintenance of the water tank can be easily performed.

Furthermore, since the water tank in accordance with the present invention comprises three reinforcing bars 18 disposed at the center portion thereof, the inner space of the water tank becomes larger than that of the conventional water tank having reinforcing members arranged transversally and longitudinally in the water tank and thereby cleaning operation can be easily performed.

Additionally, the surfaces of the packing members 19 facing to the inside the water tank are surrounded by the protecting members 23 made of stainless steel plate and, therefore, prevented from contacting with water, thereby preventing the deterioration of the packing members and lengthening the life thereof.

Moreover, since the water tank in accordance with the present invention comprises the upper part having the air vent 13 at the center portion thereof, chlorine gas included in the tap water can be easily evacuated. Accordingly, corrosion of the stainless steel panels caused by the chlorine gas can be prevented.

Besides, since the water tank in accordance with the present invention comprises the cylindrical body and the cone-shaped bottom part, the weight center thereof is not biased far from the center portion. Therefore, even if the water tank is installed rather unevenly, the magnitude of the localized pressure concentration is not as severe as that of the conventional water tank of rectangular parellelopiped shape and thereby the fracture of the water tank can be prevented.

As described above, by using the water tank in accordance with the present invention, the contamination of water caused by rust can be prevented and water and the sediments in the water tank can be easily removed through the drain pipe while the maintenance of the water tank is facilitated and the corrosion of the stainless steel panels due to the chlorine gas included in the tap water can be prevented, thereby extending the life of the packing member and simplifying the installation of the water tank.

While the present invention has been described with respect to the particular embodiments, it will be apparent to those skilled in the art that various changes and modifications may be made without departing from the spirit and scope of the invention as defined in the following claims. For example, although it is preferable that the body of the water tank is of a cylindrical shape in order to distribute water pressure uniformly, it is not restricted to cylindrical shape. Further, the top part and the bottom part may be of an octangular pyramid, a dodecagonal pyramid or any other polygonal pyramid shape.

What is claimed is:

1. A water tank made of stainless steel and having a substantially cylindrical shape, comprising:

a plurality of curved stainless steel panels, the curved stainless steel panels being coupled together to form a substantially cylindrical body of the water tank, each of the curved stainless steel panels including a number of holes and a first connecting portion extruded to the outside of the water tank;

a plurality of fan-shaped stainless steel panels being disposed at an upper portion and a lower portion to form a cone-shaped top part and a cone-shaped bottom part of the water tank, respectively, each of the fan-shaped stainless steel panels including a number of holes and a first connecting portion extruding to the outside of the water tank;

a plurality of packing members being inserted between the first and the second connecting portions;

a plurality of reinforcing members, each having an L-shaped cross-section and a number of holes on one side portion and being arranged on both sides of the first and the second connecting portion;

a number of bolts and nuts for coupling the curved stainless steel panels, fan-shaped stainless steel panels and the reinforcing members together by being inserted into the holes formed on the first connecting portions, the second connecting portions and the reinforcing members;

a plurality of reinforcing bars, both end portions of each of the reinforcing bars being fixed to the fan-shaped stainless steel panels forming the top part and the fan-shaped stainless steel panels forming the bottom part, respectively;

an air vent disposed on the center portion of the top part; and a drain pipe disposed on the center portion of the bottom part.

2. The water tank of claim 1, further comprising protecting members made of stainless steel plate, the protecting members being arranged on the surfaces of the packing members facing the inside of the water tank in order to prevent the packing member from contacting with water.

3. The water tank of claim 1, wherein the bolts, the nuts, the reinforcing members and the reinforcing bars are made of stainless steel.

4. The water tank of claim 1, wherein the reinforcing members are made of steel and surfaces of the reinforcing members which contact with the connecting portions of the stainless panels are coated with anti-corrosive paint.

* * * * *